United States Patent [19]

Terasawa

[11] Patent Number: 4,560,243

[45] Date of Patent: Dec. 24, 1985

[54] PROJECTION LENS

[75] Inventor: Hidenori Terasawa, Kawasaki, Japan

[73] Assignee: Nippon Kogaku K.K., Tokyo, Japan

[21] Appl. No.: 624,696

[22] Filed: Jun. 26, 1984

[30] Foreign Application Priority Data

Jun. 30, 1983 [JP] Japan .................... 58-119420

[51] Int. Cl.$^4$ ............................. G02B 9/58
[52] U.S. Cl. ................................... 350/469
[58] Field of Search ......................... 350/469

[56] References Cited

U.S. PATENT DOCUMENTS 4,083,628  4/1978  Koizumi ..................... 350/469
4,159,166  6/1979  Kasahara et al. ............ 350/469 X
4,319,810  3/1982  Mori ......................... 350/469

Primary Examiner—John K. Corbin
Assistant Examiner—Scott J. Sugarman
Attorney, Agent, or Firm—Fitzpatrick, Cella, Harper & Scinto

[57] ABSTRACT

A symmetrical type projection lens comprises first lens composed of positive and negative lenses disposed in the order starting from the object side and cemented to each other. The first lens is in the form of a meniscus lens having its convex face at the object side and having a total negative focal length. The projection lens comprises a second lens which is in the form of a positive meniscus lens having its convex face at the object side, a stop, third lens which is in the form of a positive meniscus lens having its convex face at the image side, and fourth lens composed of negative and positive lenses cemented to each other and being in the form of a meniscus lens which is convex at the image side and has a total negative focal length.

The first and second lenses are symmetrically arranged respectively relative to the third and fourth lenses about the stop. The projection lens satisfies the certain conditions.

17 Claims, 6 Drawing Figures

SPHERICAL
ABERRATION

ASTIGMATISM

LATERAL ABERRATION

SPHERICAL
ABERRATION

ASTIGMATISM

LATERAL ABERRATION

PROJECTION LENS

BACKGROUND OF THE INVENTION

1. Field of the Invention

The present invention relates to a projection lens suitable for use in plate-making or duplication which chiefly takes images substantially at real size.

2. Description of the Prior Art

Among plate-making lenses generally used in the prior art, a lens assembly having a relatively long focal length, about 400 mm or more, is mostly composed of four lenses which are arranged as shown in FIG. 1. The covering angle thereof is in the order of from 40° to 50° and the F-number thereof is in the order of 9 to 16. In such lens assemblies, it is difficult to correct the curvature of field. At the intermediate angle of view, the sagittal image surface in the curvature of field becomes convex to negative. At the margin, contrarily, the sagittal image surface changes to be convex toward positive to a large extent. As the angle of view is near 50°, the meridional image surface in the curvature of field changes to negative at the marginal portion to a great extent. Although it is recently desired to improve the plate-making lens assemblies with respect to quality of image, it is difficult to obtain a plate-making lens of reduced size and providing highly improved images because of longer focal length.

SUMMARY OF THE INVENTION

It is therefore an object of the present invention to provide a projection lens assembly of reduced size and of such a structure that can correct any warp in the curvature of field and exhibit a high performance throughout a picture plane.

The present invention provides a symmetrical type projection lens assembly which comprises first lens means composed of positive and negative lenses disposed in the order starting from the object side and cemented to each other, said first lens means being in the form of a meniscus lens having its convex face at the object side and having a total negative focal length, second lens means being in the form of a positive meniscus lens having its convex face at the object side, a stop, third lens means being in the form of a positive meniscus lens having its convex face at the image side, and fourth lens means composed of negative and positive lenses cemented to each other and being in the form of a meniscus lens which is convex at the image side and has a total negative focal length, said first and second lens means being symmetrically arranged respectively relative to said third and fourth lens means about said stop, said lens assembly fulfilling the following conditions:

$0.6D < d3 < 1.2D$ $0.12f < l < 0.21f$ $0.1f < r1 < 0.15f$ $0.02 < N1-N2 < 0.1$ $0.14f < r4 < 0.22f$ where
- D: the central thickness of the first lens means;
- d3: the air gap between the first and second lens means;
- f: the total focal length of the lens assembly;
- l: the entire length of the lens assembly;
- r1: the radius of curvature of the first lens means at the face thereof remote from the stop;
- N1: the refractive index of the positive lens in the first lens means for d-line ($\lambda = 587.6$ nm);
- N2: the refractive index of the negative lens in the first lens means for d-line ($\lambda = 587.6$ nm); and
- r4: the radius of curvature of the second lens means at the face thereof remote from the stop.

The present invention utilizes a lens system generally called "orthometa type" which is basically composed of six lenses. As well known, the orthometa type lens system is suitable for use as a wide angle lens, but tends to increase in size in comparison with four-lens systems. This is because when one requires an orthometa type lens system of reduced size, there is highly produced a comatic flare among various aberrations about the object point off the optical axis. Although the orthometa type lens system according to the present invention has its entire length (0.15f) smaller than the total focal length (f), it can be compensated about its comatic flare by providing an air gap d3 between the first and second lens means which is significantly larger than the central thickness D of the first lens means in comparison with the prior art orthometa type lens systems. When the air gap d3 between the first and second lens means is increased, the second, positive meniscus lens has such a function that the deviation in the light beam near the pupil, that is, in the light beam at the positive side in the aberration diagram of comatic aberration is biased on the negative side while the bonded negative meniscus lens has such a function that the deviation in said positive side light beam is biased to the positive side. By balancing these functions, the comatic flare can be corrected.

DETAILED DESCRIPTION OF THE PREFERRED EMBODIMENTS

Figure 1:
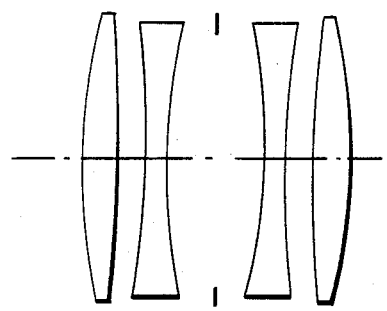
FIG. 1 shows a plate-making or duplicating lens used in the prior art.
Figure 2:
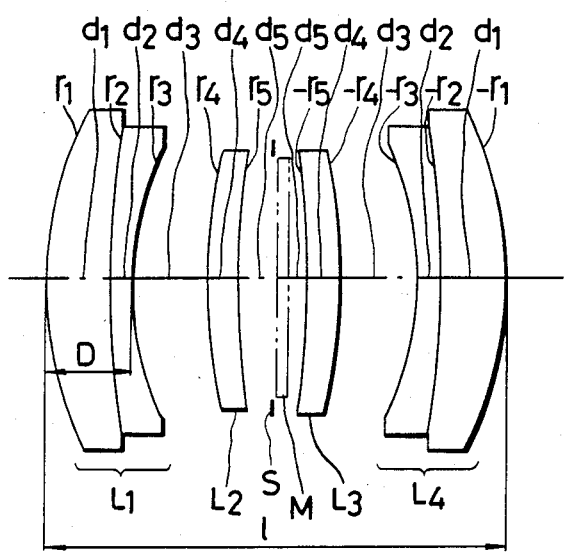
FIG. 2 is a cross-sectional view of a lens system which is the first embodiment of the present invention.
Figure 3:
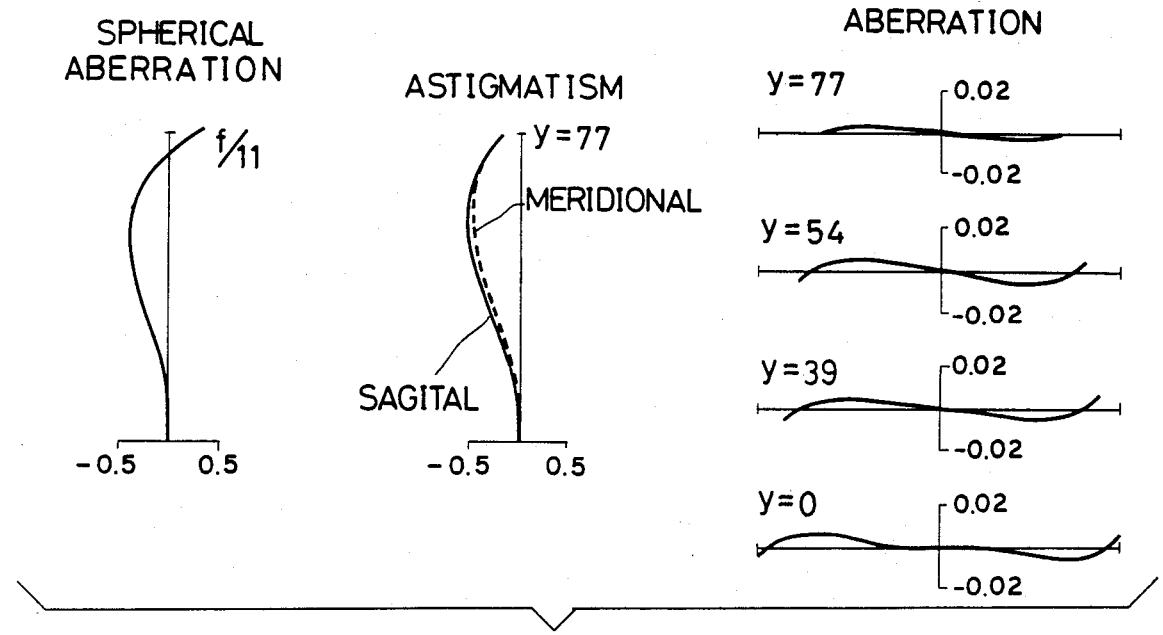
FIG. 3 illustrates various aberrations in the first embodiment of the present invention.
Figure 4:
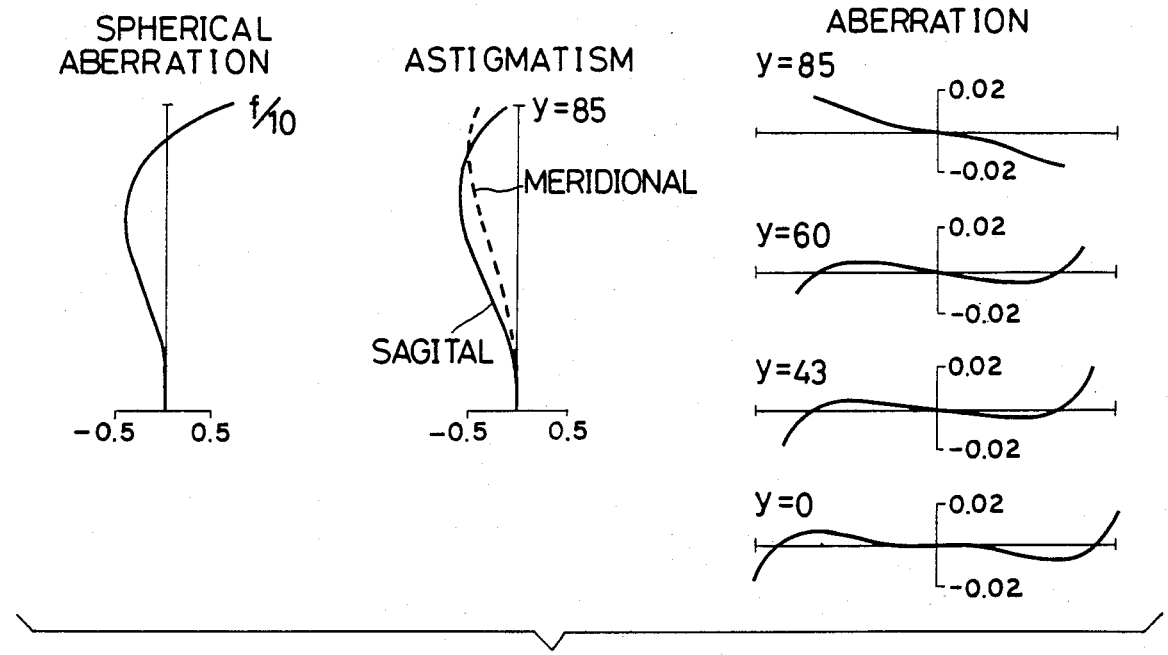
FIG. 4 illustrates various aberrations in the second embodiment of the present invention.
Figure 5:
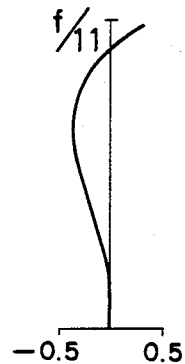
FIG. 5 illustrates various aberrations in the third embodiment of the present invention.
Figure 5:
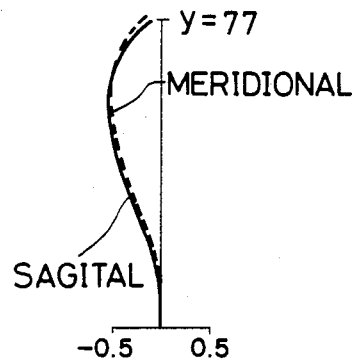
Figure 5:
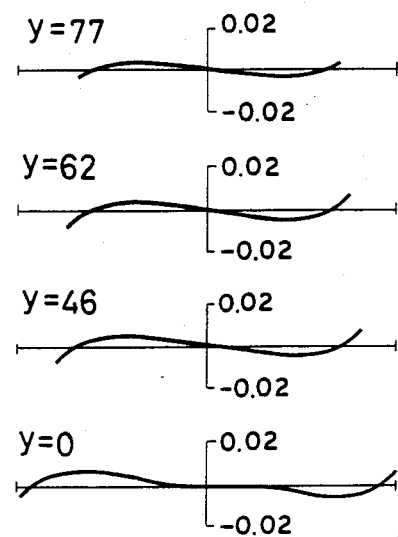
Figure 6:
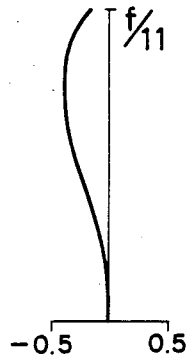
FIG. 6 illustrates various aberrations in the fourth embodiment of the present invention.
Figure 6:
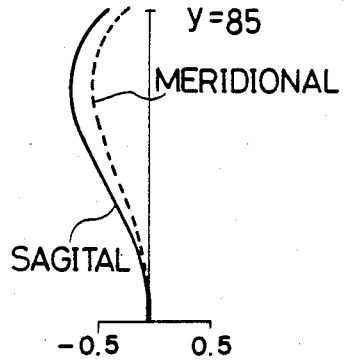
Figure 6:
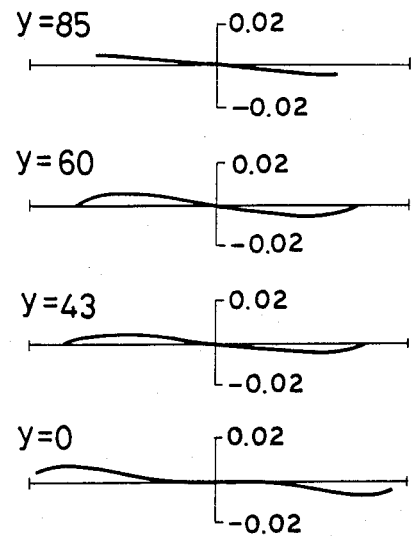

FIG. 2 is a view showing the construction of a symmetrical type lens assembly in accordance with the present invention. The lens assembly comprises a first lens L1, a second lens L2, a third lens L3 and a fourth lens L4 which are disposed in the described order starting from the object side. The first lens L1 is a meniscus lens having its convex face located at the object side. The first meniscus lens L1 includes a positive lens part located at the object side and a negative lens part cemented to the positive lens part at the opposite side thereof and has a negative focal length. The second lens L2 is a positive meniscus having its convex face located at the object side. A stop S is located between the second and third lens L2, L3. The third lens L3 is a positive meniscus lens having its convex face located at the image side. The fourth lens L4 is a meniscus lens having its convex face disposed at the image side. This fourth meniscus lens L4 has positive and negative lens parts cemented to each other to have a negative focal length with the positive lens part being located at the image side. Furthermore, the first and second lenses L1, L2 are substantially symmetrically disposed respectively relative to the third and fourth lenses L3, L4 about the stop S.

The above-mentioned lens assembly according to the present invention satisfies the following conditions:

$$0.6D < d3 < 1.2D \quad (1)$$

$$0.12f < l < 0.21f \quad (2)$$

$$0.1f < r1 < 0.15f \quad (3)$$

$$0.02 < N1-N2 < 0.1 \quad (4)$$

$$0.14f < r4 < 0.22f \quad (5)$$

where
D: the central thickness of the first lens;
d3: the air gap between the first and second lenses;
f: the total focal length of the lens assembly;
l: the entire length of the lens assembly;
r1: the radius of curvature of the first lens at the face thereof remote from the stop;
N1: the refractive index of the positive lens part in the first lens for d-line ($\lambda$=587.6 nm);
N2: the refractive index of the negative lens part in the first lens for d-line ($\lambda$=587.6 nm); and
r4: the radius of curvature of the second lens at the face thereof remote from the stop.

Each of the above conditions will now be described one at a time.

If the upper limit in the condition (1) is exceeded, the curvature of field becomes too large. If the air gap (d3) is out of the lower limit in the condition (1), a comatic flare would be produced to a large extent and the object of the present invention cannot be attained.

The condition (2) restricts the entire size of the lens system to the desired value. If the length of the lens assembly exceeds the upper limit in the condition (2), the entire size thereof would be increased impractically although the performance thereof may be improved. If the length of the lens assembly is less than the lower limit in the condition (2), the warp in the image plane would be increased and the comatic flare could not be corrected.

If the value (r1) exceeds the upper limit in the condition (3), the Petzval sum would be increased. When it is desired to correct the increase of the Petzval sum, the curvature of field will be increased. It will thus be difficult to obtain an image having a good quality throughout. If the value (r1) is less than the lower limit in the condition (3), the comatic flare could not be corrected.

If the value (N1-N2) exceeds the upper limit in the condition (4), one must correct the tendency of the Petzval sum to minus so that the curvature of field will be increased undesirably. If the value (N1-N2) is less than the lower limit of the condition (4), one must contrarily correct the increase of the Petzval sum so that the comatic flare will be increased.

If the value (r4) exceeds the upper limit of the condition (5), the curvature of field becomes too large. If this value is downwardly out of the lower limit in the condition (5), the meridional image surface at the marginal angle of view becomes too small so that the comatic flare at the intermediate angle of view will be increased.

In the above-mentioned arrangement, it is preferred that the lens assembly according to the present invention fulfills the following condition:

$$N3 < N1 \quad (6)$$

where N3 is the refractive index of the second lens for d-line ($\lambda$=587.6 nm).

If this condition (6) is not fulfilled, the Petzval sum could not be corrected without increasing the value (r1), resulting in increased curvature of field.

In the above-mentioned arrangement, it is further desirable to fulfill the following condition:

$$0.12f < l < 0.19f \quad (7).$$

Although first, second and third examples described hereinafter fulfill this condition (7), the fourth example described hereinafter does not fulfill the condition (7).

Some examples according to the present invention will now be described below.

Each of the first to fourth examples according to the present invention is of a structure which is completely symmetrical with respect to the stop as shown in FIG. 2. The first lens (L1), which is a negative cemented meniscus lens, is the same as the fourth lens (L4) while the second lens (L2) which is a positive meniscus lens is the same as the third lens (L3). Therefore, the radius of curvature in each lens face of the third and fourth lenses (L3, L4) is equal in absolute value but opposite in sign to that of the corresponding lens face of the second and first lenses (L2, L1). The central thickness of the third or fourth lens (L3 or L4) is equal to that of the second or first lens (L2 or L1). Further, the air gap between the first and second lenses is equal to that between the third and fourth lenses. Therefore, the following examples only show data from the first lens L1 to the stop S. In these examples, r1 to r5 represent the radii of curvature in the respective lens faces; d1 to d4 represent the central thicknesses and air gaps, respectively; N1, N2 or N3 represents the refractive index of each of the lenses for d-line ($\lambda$=578.6 nm); $\nu$1, $\nu$2 or $\nu$3 represents Abbe number in each of the lenses; and d5 shows the gap between the stop and the lens face of the lens opposed to the stop.

As shown in FIG. 2, further, a mirror M may be used in place of the stop S to provide a reflection type lens assembly for a copying machine, which is composed of the lens L1, lens L2 and mirror M.

EXAMPLE 1

| f = 100, f/11, 2$\omega$ = 42°, l = 15.452 | | | |
|---|---|---|---|
| r1 = 13.083 | d1 = 2.095 | N1 = 1.6204 | $\nu$1 = 60.3 |
| r2 = 27.104 | d2 = 0.851 | N2 = 1.5512 | $\nu$2 = 49.6 |
| r3 = 11.022 | d3 = 2.432 | | |
| r4 = 18.881 | d4 = 1.074 | N3 = 1.4978 | $\nu$3 = 82.3 |
| r5 = 25.065 | d5 = 1.274 | | |

EXAMPLE 2

| f = 100, f/10, 2$\omega$ = 46°, l = 18.034 | | | |
|---|---|---|---|
| r1 = 12.786 | d1 = 2.590 | N1 = 1.5891 | $\nu$1 = 61.2 |
| r2 = 25.257 | d2 = 0.891 | N2 = 1.5512 | $\nu$2 = 49.6 |
| r3 = 10.759 | d3 = 2.589 | | |

-continued

| f = 100, f/10, 2ω = 46°, l = 18.034 | | | |
|---|---|---|---|
| r4 = 19.098 | d4 = 1.020 | N3 = 1.4978 | ν3 = 82.3 |
| r5 = 26.864 | d5 = 1.927 | | |

EXAMPLE 3

| f = 100, f/11, 2ω = 42°, l = 15.456 | | | |
|---|---|---|---|
| r1 = 12.855 | d1 = 2.095 | N1 = 1.60311 | ν1 = 60.7 |
| r2 = 33.941 | d2 = 0.851 | N2 = 1.55115 | ν3 = 49.6 |
| r3 = 10.874 | d3 = 2.399 | | |
| r4 = 18.635 | d4 = 1.074 | N3 = 1.51680 | ν3 = 64.1 |
| r5 = 24.497 | d5 = 1.309 | | |

EXAMPLE 4

| f = 100, f/11, 2ω = 46°, l = 19.064 | | | |
|---|---|---|---|
| r1 = 13.840 | d1 = 2.694 | N1 = 1.60311 | ν1 = 60.7 |
| r2 = 31.876 | d2 = 1.036 | N2 = 1.55200 | ν2 = 49.7 |
| r3 = 11.543 | d3 = 2.497 | | |
| r4 = 20.444 | d4 = 1.036 | N3 = 1.49782 | ν3 = 82.3 |
| r5 = 28.785 | d5 = 2.269 | | |

Various aberrations in the examples 1, 2, 3 and 4 are shown in FIGS. 3, 4, 5 and 6, respectively. In all the examples, it is understood that various aberrations, particularly curvature of field and coma are well corrected although the entire length of the lens assembly is 15–25% of the total focal length thereof. Thus, the present invention provides a plate-making lens assembly having an excellent performance.

In accordance with the present invention, the lens assembly may substantially be symmetrical in arrangement although if it has its completely symmetrical arrangement with respect to the stop, the lens assembly can easily and simply be manufactured.

I claim:

1. A symmetrical type lens assembly comprising first lens means including a positive lens located at the object side and a negative lens located at the image side and cemented to the positive lens, said first lens means being in the form of a meniscus lens having its convex face located at the object side and having a total focal length which is negative; second lens means in the form of a positive meniscus lens having its convex face located at the object side; a stop; third lens means in the form of a positive meniscus lens having its convex face located at the image side; and fourth lens means including a negative lens located at the object side and a positive lens located at the image side and cemented to the negative lens, said fourth lens means being in the form of a meniscus lens having its convex face located at the image side and having a total focal length which is negative; said first and second lens means being substantially symmetrically arranged relative to said fourth and third lens means about said stop, said first, second, third and fourth lens means being arranged in the described order starting from the object side; further said symmetrical type lens assembly being adapted to fulfill the following conditions:

$$0.12f < l < 0.21f$$

$$0.14f < r4 < 0.22f$$

where f: the total focal length of the lens system;
l: the entire length of the lens system; and
r4: the radius of curvature of the second lens means at the face thereof remote from the stop.

2. A symmetrical type lens assembly as defined in claim 1 wherein said first lens means is disposed symmetrically to said fourth lens means about said stop, the refractive index of the positive lens in said first lens means being equal to that of the positive lens in said fourth lens means, the refractive index of the negative lens in said first lens means being equal to that of the negative lens in said fourth lens means and wherein said second lens means is disposed symmetrically to said third lens means about said stop, the refractive indicies of said second and third lens means being equal to each other.

3. A symmetrical type lens assembly as defined in claim 2 wherein said lens assembly has the following numeral data:

| f = 100, f/11, 2ω = 42°, l = 15.452 | | | |
|---|---|---|---|
| r1 = 13.083 | d1 = 2.095 | N1 = 1.6204 | ν1 = 60.3 |
| r2 = 27.104 | d2 = 0.851 | N2 = 1.5512 | ν2 = 49.6 |
| r3 = 11.022 | d3 = 2.432 | | |
| r4 = 18.881 | d4 = 1.074 | N3 = 1.4978 | ν3 = 82.3 |
| r5 = 25.065 | d5 = 1.274 | | |

4. A symmetrical type lens assembly as defined in claim 2 wherein said lens assembly has the following numerical data:

| f = 100, f/10, 2ω = 46°, l = 18.034 | | | |
|---|---|---|---|
| r1 = 12.786 | d1 = 2.590 | N1 = 1.5891 | ν1 = 61.2 |
| r2 = 25.257 | d2 = 0.891 | N2 = 1.5512 | ν2 = 49.6 |
| r3 = 10.759 | d3 = 2.589 | | |
| r4 = 19.098 | d4 = 1.020 | N3 = 1.4978 | ν3 = 82.3 |
| r5 = 26.864 | d5 = 1.927 | | |

5. A symmetrical type lens assembly as defined in claim 2 wherein said lens assembly has the following numerical data:

| f = 100, f/11, 2ω = 42°, l = 15.456 | | | |
|---|---|---|---|
| r1 = 12.855 | d1 = 2.095 | N1 = 1.60311 | ν1 = 60.7 |
| r2 = 33.941 | d2 = 0.851 | N2 = 1.55115 | ν3 = 49.6 |
| r3 = 10.874 | d3 = 2.399 | | |
| r4 = 18.635 | d4 = 1.074 | N3 = 1.51680 | ν3 = 64.1 |
| r5 = 24.497 | d5 = 1.309 | | |

6. A symmetrical type lens assembly as defined in claim 2 wherein said lens assembly has the following numerical data:

| f = 100, f/11, 2ω = 46°, l = 19.064 | | | |
|---|---|---|---|
| r1 = 13.840 | d1 = 2.694 | N1 = 1.60311 | ν1 = 60.7 |
| r2 = 31.876 | d2 = 1.036 | N2 = 1.55200 | ν2 = 49.7 |
| r3 = 11.543 | d3 = 2.497 | | |
| r4 = 20.444 | d4 = 1.036 | N3 = 1.49782 | ν3 = 82.3 |
| r5 = 28.785 | d5 = 2.269 | | |

7. A symmetrical type lens assembly as defined in claim 1 wherein said lens assembly further fulfills the conditions:

$$0.6D < d3 < 1.2D$$

$0.1f < r1 < 0.15f$ $0.02 < N1-N2 < 0.1$ where
D: the central thickness of the first lens means;
d3: the air gap between the first and second lens means;
r1: the radius of curvature of the first lens means at the face thereof remote from the stop;
N1: the refractive index of the positive lens in the first lens means; and
N2: the refractive index of the negative lens in the first lens means.

8. A symmetrical type lens assembly as defined in claim 7, wherein said lens assembly further fulfills the condition:

$0.12f < l < 0.19f$ where l is the entire length of the lens system.

9. A symmetrical type lens assembly as defined in claim 7 wherein said lens assembly further fulfills the condition:

$N3 < N1$ where N3 is the refractive index of said second lens means.

10. A reflection type lens assembly comprising first lens means including a positive lens located at the object side and a negative lens located at the image side and cemented to the positive lens, said first lens means being in the form of a meniscus lens having its convex face at the object side and having a total focal length which is negative; second lens means in the form of a positive meniscus lens having its convex face located at the object side; and a flat reflection plate for reflecting light from said first and second lens means to the object side again through said first and second lens means, said first and second lens means and said flat reflection plate being arranged in the described order starting from the object side, said reflection type lens assembly being adapted to fulfill the following conditions:

$0.12f < l < 0.21f$ $0.14f < r4 < 0.22f$ where
f: the total focal length of the lens system;
l: the entire length of the lens system; and
r4: the radius of curvature of the second lens means at the face remote from said flat reflection plate.

11. A reflection type lens assembly as defined in claim 10 wherein said lens assembly has the following numerical data:

| f = 100, f/11, 2ω = 42°, l = 15.452 | | | |
|---|---|---|---|
| r1 = 13.083 | d1 = 2.095 | N1 = 1.6204 | ν1 = 60.3 |
| r2 = 27.104 | d2 = 0.851 | N2 = 1.5512 | ν2 = 49.6 |
| r3 = 11.022 | d3 = 2.432 | | |
| r4 = 18.881 | d4 = 1.074 | N3 = 1.4978 | ν3 = 82.3 |
| r5 = 25.065 | d5 = 1.274 | | |

12. A reflection type lens assembly as defined in claim 10 wherein said lens assembly has the following numerical data:

| f = 100, f/11, 2ω = 42°, l = 15.456 | | | |
|---|---|---|---|
| r1 = 12.855 | d1 = 2.095 | N1 = 1.60311 | ν1 = 60.7 |
| r2 = 33.941 | d2 = 0.851 | N2 = 1.55115 | ν3 = 49.6 |
| r3 = 10.874 | d3 = 2.399 | | |
| r4 = 18.635 | d4 = 1.074 | N3 = 1.51680 | ν3 = 64.1 |
| r5 = 24.497 | d5 = 1.309 | | |

13. A reflection type lens assembly as defined in claim 1 wherein said lens assembly has the following numerical data:

| f = 100, f/11, 2ω = 42°, l = 15.456 | | | |
|---|---|---|---|
| r1 = 12.855 | d1 = 2.095 | N1 = 1.60311 | ν1 = 60.7 |
| r2 = 33.941 | d2 = 0.851 | N2 = 1.55115 | ν3 = 49.6 |
| r3 = 10.874 | d3 = 2.399 | | |
| r4 = 18.635 | d4 = 1.074 | N3 = 1.51680 | ν3 = 64.1 |
| r5 = 24.497 | d5 = 1.309 | | |

14. A reflection type lens assembly as defined in claim 10 wherein said lens assembly has the following numerical data:

| f = 100, f/11, 2ω = 46°, l = 19.064 | | | |
|---|---|---|---|
| r1 = 13.840 | d1 = 2.694 | N1 = 1.60311 | ν1 = 60.7 |
| r2 = 31.876 | d2 = 1.036 | N2 = 1.55200 | ν2 = 49.7 |
| r3 = 11.543 | d3 = 2.497 | | |
| r4 = 20.444 | d4 = 1.036 | N3 = 1.49782 | ν3 = 82.3 |
| r5 = 28.785 | d5 = 2.269 | | |

15. A reflection type lens assembly as defined in claim 10 wherein said lens assembly further fulfills the conditions:

$0.6D < d3 < 1.2D$ $0.1f < r1 < 0.15f$ $0.02 < N1-N2 < 0.1$ wherein
D: the central thickness of the first lens means;
d3: the air gap between the first and second lens means;
r1: the radius of curvature of the first lens means at the face remote from the flat reflection plate;
N1: the refractive index of the positive lens in said first lens means; and
N2: the refractive index of the negative lens in said first lens means.

16. A reflection type lens assembly as defined in claim 10 wherein said lens assembly further fulfills the condition:

$0.12f < l < 0.19f$ where l is the entire length of the lens system.

17. A symmetrical type lens assembly as defined in claim 15 wherein said lens assembly further fulfills the condition:

$N3 < N1$ where N3 is the refractive index of said second lens means.

* * * * *

UNITED STATES PATENT AND TRADEMARK OFFICE
CERTIFICATE OF CORRECTION

PATENT NO. : 4,560,243
DATED : December 24, 1985
INVENTOR(S) : HIDENORI TERASAWA It is certified that error appears in the above-identified patent and that said Letters Patent are hereby corrected as shown below:

Claim 13, line 2, change "1" to --10--;

between lines 16 and 22, change

"

| $f = 100$, $f/11$, $2\omega = 42°$, $l = 15.456$ ||||
|---|---|---|---|
| r1 = 12.855 | d1 = 2.095 | N1 = 1.60311 | ν1 = 60.7 |
| r2 = 33.941 | d2 = 0.851 | N2 = 1.55115 | ν3 = 49.6 |
| r3 = 10.874 | d3 = 2.399 | | |
| r4 = 18.635 | d4 = 1.074 | N3 = 1.51680 | ν3 = 64.1 |
| r5 = 24.497 | d5 = 1.309 | | |

"

to --

$f = 100$, $f/10$, $2\omega = 46°$, $l = 18.034$

| | | | |
|---|---|---|---|
| r1 = 12.786 | d1 = 2.590 | N1 = 1.5891 | ν1 = 61.2 |
| r2 = 25.257 | d2 = 0.891 | N2 = 1.5512 | ν2 = 49.6 |
| r3 = 10.759 | d3 = 2.589 | | |
| r4 = 19.098 | d4 = 1.020 | N3 = 1.4978 | ν3 = 82.3 |
| r5 = 26.864 | d5 = 1.927 | | |

--

Signed and Sealed this

Twenty-fifth Day of March 1986

[SEAL]

Attest:

DONALD J. QUIGG

Attesting Officer

Commissioner of Patents and Trademarks